Aug. 26, 1958        J. F. KINKEL        2,849,669

ELECTRONIC CLOSED LOOP SYSTEM

Filed Oct. 25, 1955

INVENTOR.
JOHN F. KINKEL
BY
ATTORNEY

United States Patent Office 2,849,669
Patented Aug. 26, 1958

2,849,669

ELECTRONIC CLOSED LOOP SYSTEM

John F. Kinkel, Altadena, Calif., assignor, by mesne assignments, to Consolidated Electrodynamics Corporation, Pasadena, Calif., a corporation of California Application October 25, 1955, Serial No. 542,623

6 Claims. (Cl. 318—32)

This invention relates to servo systems and particularly to improved control circuitry therefor.

This application is a continuation of my co-pending application, Serial Number 311,419, filed September 25, 1952, and entitled "Electronic Closed Loop System," now abandoned.

A closed loop system generally involves means for developing an error signal responsive to variations in a given function, means for sensing the error signal, means for amplifying the error signal, energy means for acting on the function, and means for applying the amplified error signal to actuate the energy means to act on the variable so as to reduce the error signal. An electrometer amplifier is one example of such a closed loop system.

Another form of closed loop system includes, as the means of developing an error signal, an electromechanical transducer. A force balance is an example of this form. In a force balance, force applied to an input transducer is counter-balanced by an electrically energized magnetic coil, the voltage developed in the transducer responsive to displacement being amplified and returned to the coil to automatically balance the system. The stiffness of such a system, i. e. the force (F) required to achieve a transducer displacement $\Delta X$ is the sum of the mechanical stiffness ($k_m$) and the electrical stiffness ($k_e$). Thus the force required to accomplish a system deflection $\Delta X$ is given by the expression:

$$F = (k_m + k_e)\Delta X \tag{1}$$

The objective in many servo systems is to achieve the highest possible linearity of response. The following expression can be developed mathematically:

$$i/F = \frac{k_e/k_m}{k_e/k_m + 1} \tag{2}$$

where:

$i/F$ represents the steady state equilibrium so that unless both mechanical and electrical systems are linear, then $$\frac{k_e}{k_m} = f(F) \tag{3}$$

It follows, therefore, that the higher the ratio $$\frac{k_e}{k_m}$$

the more linear will the system be. This ratio $$\frac{k_e}{k_m}$$

is determined by the following expression:

$$\frac{k_e}{k_m} = 1/k_m (\beta\rho)(V/\Delta X)(i/V_i) \tag{4}$$

where:

$\beta$ = the flux density in the gap in webers per square meter;
$\rho$ = length of magnetic coil in meters;
$V/\Delta X$ = the gain of the transducer (voltage output for displacement $\Delta X$); and
$i/V_i$ = the gain of the amplifier (as output current for a given input voltage).

Considering the various factors determinative of the ratio $$\frac{k_e}{k_m}$$

as given in Equation 4 above, and entering into any consideration of means or methods of increasing the ratio, it is possible to eliminate certain factors therefrom which are inherently fixed in a given range of values. Thus the mechanical stiffness $k_m$ is limited in the extent to which it can be decreased by practical considerations. Improvements in linearity beyond a certain point depend, therefore, upon increasing electrical stiffness to the greatest practical extent. Electrical stiffness ($k_e$) in a typical force balance, as determined from Equation 4 above, is given by the expression:

$$k_e = \beta\rho(V/\Delta X)(i/V_i) \tag{5}$$

Here again there are definite limitations on the magnitude of a practical achieved flux density ($\beta$) on the length of the magnetic coil ($\rho$), and on the gain of the transducer ($V/\Delta X$). Hence the only remaining approach to the problem of linearity of a servo system is with regard to the function $i/V_i$, which is in turn a function of the loop gain.

However, in order to achieve the desired high degree of linearity it is not possible to merely increase the gain of the system without consideration of the additional complicating factor of transient stability. Thus, as loop gain is increased throughout the entire frequency range, transient response becomes an ever increasing problem. However, if the ratio $$\frac{k_e}{k_m}$$

(open loop gain) can be made to approach infinity at D. C., this problem is avoided. To accomplish this end and in view of the above analysis, it is necessary to provide a loop having a gain approaching infinity at low frequencies down to and including D. C., and a controlled lower gain at the higher frequencies encountered during transient periods.

Circuits have previously been developed which achieve the desired end to a limited extent. Such circuits, for example, are adapted to achieve a gain differential of say about 20 db (equivalent to a gain factor of 10) between lower frequencies and transient frequencies.

I have now developed a control circuit for closed loop systems which, to an appreciably greater degree, achieves the idealized situation stated above. The control circuit of the invention generally comprises a two-stage amplifier, means impressing a positive feedback signal on the first amplification stage, means separately impressing on the first amplification stage a negative feedback signal, and means determining the amplitude of the negative feedback signal as a function of frequency. In a specific embodiment, the positive feedback signal is applied to the cathode of the first stage amplifier tube and the negative feedback signal is applied together with the input signal on the control grid of this tube. The control circuit in itself is unstable but, as an integral element of a servo loop, results in a stable system.

The invention will be more clearly understood by reference to the following detailed description taken in conjunction with the accompanying drawing, in which.

Figure 1:
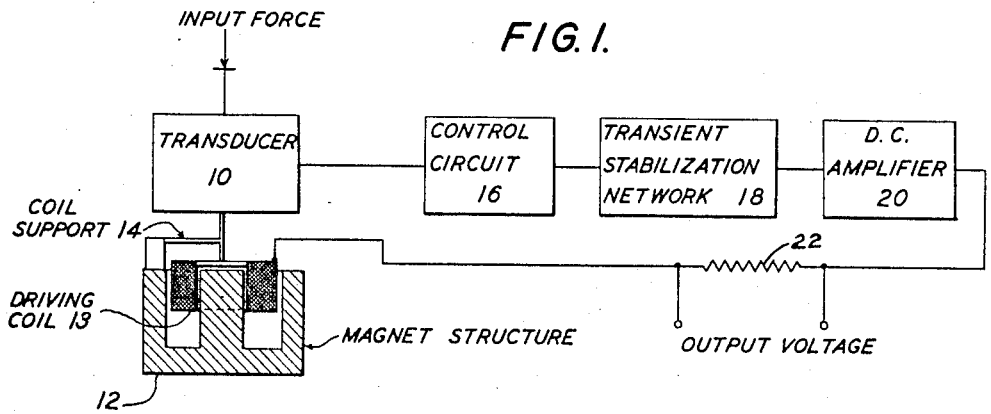
Fig. 1 is a block diagram of a typical force balance closed loop system.

Referring to Fig. 1, a typical force balance is shown including a displacement transducer 10, a magnet structure 12, and a coil 13 adapted to displacement with respect to the core of the magnet strucure 12. The displacement transducer may be of any well-known electromechanical type, such as a piezoelectric crystal, an E-pickoff device or a differential transformer, a potentiometer, or any other device that produces an output signal that varies according to the mechanical displacement of the input. The coil 13 is supported with respect to the transducer 10 by a coil support 14. The transducer is electrically connected in this instance to a control circuit 16, which is, in turn, connected through a conventional transient stabilization or lead-lag network 18 and to a D. C. power amplifier 20, the output of the amplifier being connected into the coil 13 to apply a restoring force balancing any input force on the transducer 10. A measure of the input force is the voltage developed across the resistor 22 in the servo loop, this voltage being proportional to the current supplied to the driving coil. The operation of the force balance of Fig. 1 will be considered in greater detail after description of one form of control circuit 16 as illustrated in Fig. 2.

Figure 2:
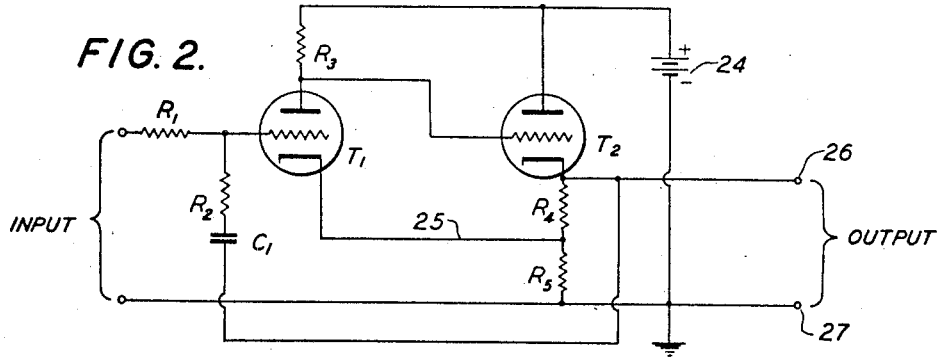
Fig. 2 is a wiring diagram of one form of control circuit in accordance with the invention.

Referring to Fig. 2, the circuit there shown comprises a two-stage amplification network including a first stage amplifier tube $T_1$ and a second stage amplifier tube $T_2$. The input signal is applied to the control grid of the tube $T_1$ through an input resistor $R_1$, the plate signal of the tube $T_1$ in turn being directly connected to the grid of the second stage tube $T_2$ in conventional fashion. Plate voltage to the tubes $T_1$ and $T_2$ is supplied from a battery 24. An internal positive feedback loop is provided by the lead 25 connecting the cathode of the first stage tube $T_1$ to a voltage divider network comprising resistors $R_4$ and $R_5$ connected between outputs 26, 27. An external negative feedback loop is connected between the output lead 26 and the grid of the first stage tube $T_1$ through a resistor $R_2$ and capacitor $C_1$.

The internal positive feedback loop provides infinite D. C. gain while the external negative feedback loop imparts to the system an integrating characteristic at low frequencies and a linear characteristic at high frequencies. The D. C. gain is determined by the relationship of the resistors $R_4$, $R_5$, and as indicated above may be made infinite by proper choice of these resistors. The integrating characteristic imparted by the negative feedback may be obtained in a frequency range from D. C. to a frequency determined by the product of $R_2$ and $C_1$. It follows that the linear characteristic imparted by the negative feedback is obtained above the predetermined frequency by the same product of $R_2$ and $C_1$. The gain of the system in the linear response region, that is, above the predetermined frequency, is determined by the ratio of $R_2$ to $R_1$.

Figure 3:
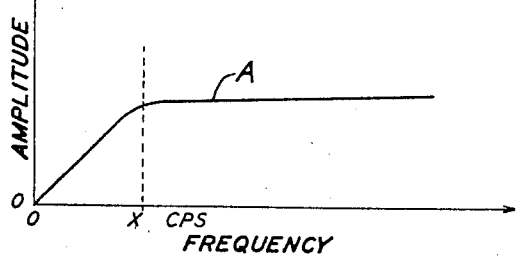
Fig. 3 is a graph showing the characteristic of the negative feedback signal.

The characteristic of the negative feedback loop is illustrated graphically in Fig. 3 where feedback amplitude is plotted against frequency. Curve A of the figure shows the negative feedback to increase linearly in amplitude from D. C. to a given frequency X and thereafter to remain at a substantially constant amplitude at increasing frequency.

Figure 4:
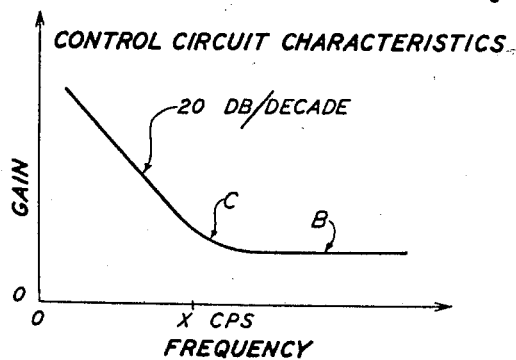
Fig. 4 is a graph showing the response characteristics of the control circuit.

The characteristics of the system of Fig. 2 are illustrated graphically in Fig. 4 wherein gain is plotted against frequency.

Curve B of Fig. 4 shows a linearly increasing gain at low frequencies, the slope of the curve being indicated at 20 decibels per decade, and a controlled gain at higher frequencies. The change from linearly increasing gain to controlled gain is at the same frequency X at which the amplitude curve A of the negative feedback (Fig. 3) approaches zero slope. By way of example, with the resistor and capacitor values of the circuit of Fig. 2 being established as follows: $R_1=R_2=1.5$ megohms, $R_3=R_4=R_5$, and $C_1=0.1$ microfarad, the break-point of the curve in Fig. 4 representing $x$ C. P. S. between the low frequency integrating characteristics and the higher frequency linear characteristics, and as indicated at the point C, is approximately one cycle per second.

If the characteristics of the control circuit as shown in Fig. 4 were compared with a conventional integrating network, the corresponding response curve of the latter type network would show a continuous integrating response from the lowest to the highest frequencies and would not include the linear portion of the respective curve B.

Consideration of the comparative characteristics of the described control circuit with a control circuit known in the art (c. f. Vacuum Tube Amplifiers, Valley and Wallman, McGraw-Hill, 1948, pp. 477–479) is best accomplished by considering the transfer function of such circuits. The transfer function ($A_1$) of the circuit herein described is given by the expression:

$$A_1 = \frac{V_0}{V_i} = \frac{TS+1}{TS - \frac{(1-KH)(2TS+1)}{K}} \quad (6)$$

for $R_1 = R_2$ and where:

$T = R_1 C_1$
$H$ = positive feedback factor
$K$ = gain of amplifier
$S$ = complex variable of the Laplace transform If the function $(1-KH)=0.1$, which is entirely consistent with conditions encountered in practice due to the inherent drift of the amplifier gain with time, temperature, etc. and the gain ($K$) is arbitrarily established at 50, then $A_1$ is established from Equation 6 as follows:

$$A_1 = \frac{TS+1}{1.004 \, TS + 0.002} \quad (7)$$

which information, as applied to the graph of Fig. 3, establishes that the maximum differential between the gain at the lowest frequency and the controlled gain at higher frequency is approximately 54 db, representing a gain factor of 500. Analyzing the present conventional control system in the same manner, it may be shown that the transfer function $A_2$ thereof is given by the following expression:

$$A_2 = \frac{K(TS+1)}{TS+(1-KH)} \quad (8)$$

Assuming the same conditions existing as in the above example, the transfer function of the presently conventional system is as follows:

$$A_2 = \frac{K(TS+1)}{TS+0.1} \quad (9)$$

If this information is transferred to a response curve similar to that of Fig. 3, it will be shown that the difference between maximum and controlled gain is approximately 20 db, equivalent to a gain factor of 10.

Under static conditions the control circuit as described imparts to the closed loop system in which it is included as a result of the fact that D. C. gain approaches infinity under such conditions, the following advantages:

(1) The restoring force is exactly equal to the input force.

(2) The amplitude linearity of the D. C. power amplifier does not affect the amplitude linearity of the system.

(3) Amplitude linearity of the displacement transducer does not affect the linearity of the system.

(4) Variations in flux density with coil position do not affect the linearity of the system.

(5) The displacement of the moving system is zero.

In addition, the linear high frequency characteristics of the control circuit provide the following advantages:

(1) Extended high frequency response of the closed loop system; and (2) Transient stability with only a single lead network.

The control circuit described and claimed herein is not limited to use in a force balance servo system, this system merely being selected for purposes of description. The control circuit may be applied to any electronic closed loop system and will provide in such a system advantages resulting from an infinite D. C. gain in conjunction with a linear high frequency response.

I claim:

1. In a closed loop servo system which is normally balanced, the combination of means generating an error signal in accordance with a condition of unbalance of the system; a control circuit coupled to the error signal generating means, said control circuit including a positive feedback path and a frequency selective negative feedback path, said feedback paths being adapted to cooperate to provide the control circuit with a gain which is inversely proportional to frequency for signals having a frequency lower than a predetermined frequency and a constant gain for signals having a frequency higher than said predetermined frequency; and means coupled to the control circuit to return the system to its normally balanced condition in response to the error signal.

2. In a closed loop servo system which is normally balanced, the combination of means generating an error signal in accordance with a condition of unbalance of the system; a control circuit coupled to the error signal generating means, said control circuit including a positive feedback path and a frequency selective negative feedback path, said feedback paths being adapted to cooperate to provide the control circuit with a gain which is inversely proportional to frequency for signals having a frequency lower than a predetermined frequency and a constant gain for signals having a frequency higher than said predetermined frequency; an amplifier coupled to the control circuit for amplifying the error signal; and means coupled to the amplifier to return the system to its normally balanced condition in response to the amplified error signal.

3. In a closed loop servo system which is normally balanced, the combination of means generating an error signal in accordance with a condition of unbalance of the system; a control circuit coupled to the error signal generating means including a first electron tube and a second electron tube, each of said electron tubes including at least a cathode, an anode and a control electrode; means connecting the anode of the first electron tube to the control electrode of the second electron tube; a voltage divider connected between the cathode of the second electron tube and ground reference potential; a positive feedback path connected between the voltage divider and the cathode of the first electron tube; a frequency selective negative feedback path comprisng a resistor and a capacitor connected serially between the cathode of the second electron tube and the control electrode of the first electron tube, said feedback paths being adapted to cooperate to provide the control circuit with a gain which is inversely proportional to frequency for signals having a frequency lower than a predetermined frequency and a constant gain for signals having a frequency greater than the predetermined frequency; and means coupled to the control circuit to return the system to its normally balanced condition in response to the error signal.

4. In a closed loop servo system which is normally balanced, the combination of means generating an error signal in accordance with a condition of unbalance of the system; a control circuit coupled to the error signal generating means including a first electron tube and a second electron tube, each of said electron tubes including at least a cathode, an anode and a control electrode; means connecting the anode of the first electron tube to the control electrode of the second electron tube; a voltage divider connected between the cathode of the second electron tube and ground reference potential; a positive feedback path connected between the voltage divider and the cathode of the first electron tube; a frequency selective negative feedback path comprising a resistor and a capacitor connected serially between the cathode of the second electron tube and the control electrode of the first electron tube, said feedback paths being adapted to cooperate to provide the control circuit with a gain which is inversely proportional to frequency for signals having a frequency lower than a predetermined frequency and a constant gain for signals having a frequency greater than the predetermined frequency; an amplifier coupled to the control circuit for amplifying the error signal; and means coupled to the amplifier to return the system to its normally balanced condition in response to the amplified error signal.

5. In a closed loop servo system which is normally balanced, the combination of means generating an error signal in accordance with a condition of unbalance of the system; a control circuit coupled to the error signal generating means including a first electron tube and a second electron tube, each of said electron tubes including at least a cathode, an anode and a control electrode; means connecting the anode of the first electron tube to the control electrode of the second electron tube; a voltage divider connected between the cathode of the second electron tube and ground reference potential; a positive feedback path connected between the voltage divider and the cathode of the first electron tube; a frequency selective negative feedback path comprising a resistor and a capacitor connected serially between the cathode of the second electron tube and the control electrode of the first electron tube, the values of resistors and capacitors in said feedback paths being so selected as to provide the control circuit with a gain which is substantially inversely proportional to frequency for signals having a frequency lower than audio frequency and a substantially constant gain for signals having a frequency greater than audio frequency; and means coupled to the control circuit to return the system to its normally balanced condition in response to the error signal.

6. In a closed loop servo system which is normally balanced, the combination of means generating an error signal in accordance with a condition of unbalance of the system; a control circuit coupled to the error signal generating means including a first electron tube and a second electron tube, each of said electron tubes including at least a cathode, an anode and a control electrode; means connecting the anode of the first electron tube to the control electrode of the second electron tube; a voltage divider connected between the cathode of the second electron tube and ground reference potential; a positive feedback path connected between the voltage divider and the cathode of the first electron tube; a frequency selective negative feedback path comprising a resistor and a capacitor connected serially between the cathode of the second electron tube and the control electrode of the first electron tube, the values of resistors and capacitors in said feedback paths being so selected as to provide the control circuit with a gain which is substantially inversely proportional to frequency for signals having a frequency lower than audio frequency and a substantially constant gain for signals having a frequency greater than audio frequency; an amplifier coupled to the control circuit for amplifying the error signal, and means coupled to the amplifier to return the system to its normally balanced condition in response to the amplified error signal.

References Cited in the file of this patent

UNITED STATES PATENTS

| | | |
|---|---|---|
| 2,190,482 | Orne | Feb. 13, 1940 |
| 2,208,623 | Bond | July 23, 1940 |
| 2,285,769 | Forster | June 9, 1942 |
| 2,293,502 | Herrman | Aug. 18, 1942 |
| 2,581,456 | Swift | June 8, 1952 |
| 2,734,736 | Payne | Feb. 14, 1956 |
| 2,780,101 | Kinkel | Feb. 5, 1957 |

OTHER REFERENCES

Radio Engineering, Terman, 3rd ed., pp. 319–324, Fig. 6–50, McGraw-Hill, New York, N. Y., 1947.

"Ultra High Gain D.-C. Amplifier Circuits," Volkers, W. K. Tech. Report TR–32, 1950.